(12) United States Patent
Miyoshi et al.

(10) Patent No.: US 12,197,048 B2
(45) Date of Patent: Jan. 14, 2025

(54) EYEGLASS LENS, EYEGLASSES, AND EYEGLASS LENS MANUFACTURING METHOD

(71) Applicants: MIYOSHI INDUSTRIAL ENTERPRISE INC., Fukui (JP); SUN-RAY CORPORATION, Osaka (JP)

(72) Inventors: Kazuyuki Miyoshi, Sabae (JP); Yoshikazu Munakata, Osaka (JP)

(73) Assignees: MIYOSHI INDUSTRIAL ENTERPRISE INC., Fukui (JP); SUN-RAY CORPORATION, Osaka (JP)

( * ) Notice: Subject to any disclaimer, the term of this patent is extended or adjusted under 35 U.S.C. 154(b) by 327 days.

(21) Appl. No.: 17/596,175

(22) PCT Filed: May 29, 2020

(86) PCT No.: PCT/JP2020/021392
§ 371 (c)(1),
(2) Date: Dec. 3, 2021

(87) PCT Pub. No.: WO2021/053887
PCT Pub. Date: Mar. 25, 2021

(65) Prior Publication Data
US 2022/0244572 A1 Aug. 4, 2022

(30) Foreign Application Priority Data
Sep. 17, 2019 (JP) ................................. 2019-168414

(51) Int. Cl.
*G02C 7/10* (2006.01)
*G02C 7/12* (2006.01)

(52) U.S. Cl.
CPC ............... *G02C 7/10* (2013.01); *G02C 7/108* (2013.01); *G02C 7/12* (2013.01)

(58) Field of Classification Search
CPC . G02C 7/10; G02C 7/108; G02C 7/12; G02C 7/06; G02C 7/105; G02B 5/3033
(Continued)

(56) References Cited

U.S. PATENT DOCUMENTS 7,328,998 B2  2/2008  Hobbs
7,572,006 B2  8/2009  Begon et al.
(Continued)

FOREIGN PATENT DOCUMENTS

JP  S44-11476 Y1  5/1969
JP  S60-80419 U   6/1985
(Continued)

OTHER PUBLICATIONS

International Search Report issued in PCT/JP2020/021392; mailed Aug. 18, 2020.
(Continued)

*Primary Examiner* — Tuyen Tra
(74) *Attorney, Agent, or Firm* — Studebaker & Brackett PC

(57) ABSTRACT

An eyeglass lens (1) includes a polarizing part (10) and a non-polarizing part (20). The polarizing part (10) includes a base part (11) and a polarizing sheet (12). The non-polarizing part (20) is adjacent to the polarizing part (10). The polarizing sheet (12) is in face contact with the base part (11) in a non-separable manner. The non-polarizing part (20) has a thickness (W1) greater than a thickness (W2) of the base part (11). The base part (11) and the non-polarizing part (20) form a light transmitting member (2) that is a single solid member. The light transmitting member (2) is made of a colored resin.

23 Claims, 11 Drawing Sheets

(58) Field of Classification Search
USPC .............................................. 351/41, 44, 49
See application file for complete search history.

(56) References Cited

U.S. PATENT DOCUMENTS

| | | |
|---|---|---|
| 7,862,165 B2 | 1/2011 | Hobbs |
| 8,042,936 B2 | 10/2011 | Hobbs |
| 8,277,045 B2 | 10/2012 | Hobbs |
| 2003/0147047 A1 | 8/2003 | Renard |
| 2004/0046927 A1 | 3/2004 | Montgomery |
| 2007/0132943 A1 | 6/2007 | Kurzrok |
| 2007/0177099 A1 | 8/2007 | Begon et al. |
| 2007/0285613 A1 | 12/2007 | Hobbs |
| 2008/0204651 A1 | 8/2008 | Hobbs |
| 2011/0075093 A1 | 3/2011 | Hobbs |
| 2011/0134386 A1 | 6/2011 | Hobbs |
| 2015/0116658 A1 | 4/2015 | Trapani et al. |
| 2016/0306195 A1 | 10/2016 | Miyoshi |

FOREIGN PATENT DOCUMENTS

| | | |
|---|---|---|
| JP | S62-41125 U | 3/1987 |
| JP | H09-179076 A | 7/1997 |
| JP | 2002-122825 A | 4/2002 |
| JP | 2004-276354 A | 10/2004 |
| JP | 2007-531032 A | 11/2007 |

OTHER PUBLICATIONS

The extended European search report issued by the European Patent Office on Aug. 22, 2023, which corresponds to European Patent Application No. 20864309.8-1020 and is related to U.S. Appl. No. 17/596,175.

EYEGLASS LENS, EYEGLASSES, AND EYEGLASS LENS MANUFACTURING METHOD

TECHNICAL FIELD

The present invention relates to an eyeglass lens, eyeglasses, and an eyeglass lens manufacturing method.

BACKGROUND ART

A visual element (eyeglass lens) disclosed in Patent Literature 1 is a lens in which three regions are defined. Specifically, the visual element disclosed in Patent Literature 1 includes a first region with a vertically oriented polarizing filter, a second region with a horizontally oriented polarizing filter, and a third region with a non-polarizing filter. The first region attenuates reflected light from a vertical plane such as a window of a building. The second region attenuates reflected light from a horizontal plane such as a water surface. A user can view a liquid-crystal display through the third region independent of polarization by the liquid-crystal display.

CITATION LIST

Patent Literature

[Patent Literature 1] Japanese Unexamined Patent Application Publication (translation of PCT Application) No. 2007-531032

SUMMARY OF INVENTION

Technical Problem

However, the first region, the second region, and the third region of the visual element disclosed in Patent Literature 1 have different polarization functions and therefore it is necessary to bond the first region, the second region, and the third region with a bonding agent so that the respective regions are arranged adjacent to one another. As such, it is necessary to adjust the transmittance of each of a polarizing part and a non-polarizing part of the lens as a whole with presence or absence of the bonding agent taken into consideration. This leads to difficulty in accurate adjustment of the transmittance of each of the polarizing part and the non-polarizing part.

The present invention has been made in view of the foregoing and has its object of providing an eyeglass lens and eyeglasses that have a polarizing part and a non-polarizing part each of which has accurately adjusted transmittance, and an eyeglass lens manufacturing method by which transmittance of each of a polarizing part and a non-polarizing part can be accurately adjusted.

Solution to Problem

An eyeglass lens according to an aspect of the present invention includes a polarizing part and a non-polarizing part. The polarizing part includes a base part and a polarizing sheet. The non-polarizing part is adjacent to the polarizing part. The polarizing sheet is in face contact with the base part in a non-separable manner. The non-polarizing part has a thickness greater than a thickness of the base part. The base part and the non-polarizing part form a light transmitting member that is a single solid member. The light transmitting member is made of a colored resin.

In the eyeglass lens of the present invention, the light transmitting member preferably has an inside that is colored.

In the eyeglass lens of the present invention, it is preferable that the light transmitting member includes an upper part and a lower part and the non-polarizing part is located adjacent to the polarizing part in the lower part of the light transmitting member.

In the eyeglass lens of the present invention, the non-polarizing part is preferably in contact with a part of an outer periphery of the polarizing sheet and out of contact with another part of the outer periphery of the polarizing sheet.

In the eyeglass lens of the present invention, the polarizing sheet preferably has a hole. The non-polarizing part is preferably located in the hole.

Preferably, the eyeglass lens of the present invention further includes a reflective layer configured to reflect part of light and transmit another part of the light. The reflective layer preferably covers the polarizing sheet and the non-polarizing part on a front side of the eyeglass lens in a direction from the base part toward the polarizing sheet.

In the eyeglass lens of the present invention, a ratio of transmittance of the polarizing part to transmittance of the non-polarizing part is preferably in a range from approximately 30% or more and approximately 70% or less.

In the eyeglass lens of the present invention, the polarizing sheet preferably includes a first cover layer, a second cover layer, and a polarizing film having a first surface and a second surface opposite to the first surface. The first cover layer preferably covers the first surface of the polarizing film. Preferably, the second cover layer covers the second surface of the polarizing film and is in face contact with the base part. Preferably, the second cover layer and the base part are made of the same material.

Preferably, the eyeglass lens of the present invention further includes a myopic part. The myopic part preferably has refractive power for near view. The myopic part is preferably located along a rear surface of the non-polarizing part in a direction from the base part toward the polarizing sheet.

In the eyeglass lens of the present invention, the polarizing sheet preferably has a front surface in a direction from the base part toward the polarizing sheet, the front surface being aligned with a front surface of the non-polarizing part in the direction from the base part toward the polarizing sheet.

According to another aspect of the present invention, eyeglasses include the aforementioned eyeglass lens and a support. The support supports the eyeglass lens.

According to still another aspect of the present invention, an eyeglass lens manufacturing method is a method for manufacturing an eyeglass lens including a polarizing part and a non-polarizing part adjacent to the polarizing part. The method includes preparing, putting, and injection molding. In the preparing, a polarizing sheet that is to be included in the polarizing part of the eyeglass lens is prepared. In the putting, the polarizing sheet is put in a mold. In the injection molding, a light transmitting member is injection molded by injecting a colored resin into the mold in which the polarizing sheet is put so that the polarizing sheet is in face contact with a base part that is included in the polarizing part, the light transmitting member being a single solid member formed of the base part and the non-polarizing part. The non-polarizing part has a thickness greater than a thickness of the base part.

In the eyeglass lens manufacturing method of the present invention, the preparing preferably includes: processing the polarizing sheet into a shape corresponding to an outer contour of the eyeglass lens; and bending the polarizing sheet into a shape corresponding to a curve of a specific lens.

Preferably, the eyeglass lens manufacturing method of the present invention further includes covering. In the covering, the polarizing sheet and the non-polarizing part are preferably covered with a reflective layer on a front side of the eyeglass lens in a direction from the base part toward the polarizing sheet, the reflective layer being for reflecting part of light and transmitting another part of the light. In the injection molding, a ratio of transmittance of the polarizing part to transmittance of the non-polarizing part is determined preferably in a range from approximately 30% or more and approximately 70% or less.

In the eyeglass lens manufacturing method of the present invention, the injection molding preferably includes disposing a myopic part along the non-polarizing part, the myopic part having refractive power for near view. In the disposing, the myopic part is preferably disposed along a rear surface of the non-polarizing part in a direction from the base part toward the polarizing sheet.

In the eyeglass lens manufacturing method of the present invention, in the injection molding, a ratio between transmittance of the polarizing part and transmittance of the non-polarizing part is preferably determined based on at least one of color of the colored resin, color density of the colored resin, and thickness of the light transmitting member.

Preferably, the eyeglass lens manufacturing method of the present invention further includes determining. In the determining, a combination of transmittance of the polarizing part and transmittance of the non-polarizing part is preferably determined based on mutually different 4 categories. The transmittance of the polarizing part preferably falls into any one of the four categories. The transmittance of the non-polarizing part preferably falls into any one of the four categories. The four categories preferably include a first category, a second category, a third category, and a fourth category. Preferably, a transmittance falling into the first category is greater than 43% and no greater than 80%. Preferably, a transmittance falling into the second category is greater than 18% and no greater than 43%. Preferably, a transmittance falling into the third category is greater than 8% and no greater than 18%. Preferably, a transmittance falling into the fourth category is greater than 3% and no greater than 8%.

In the eyeglass lens manufacturing method of the present invention, it is preferable in the injection molding to determine a transmittance of the non-polarizing part to be greater than 50%.

In the eyeglass lens manufacturing method of the present invention, it is preferable in the injection molding to determine a transmittance of the non-polarizing part to be no greater than 50%.

Advantageous Effects of Invention

According to the eyeglass lens and the eyeglasses of the present invention, each of the polarizing part and the non-polarizing part can have accurately adjusted transmittance. According to the eyeglass lens manufacturing method of the present invention, transmittance of each of the polarizing part and the non-polarizing part can be accurately adjusted.

DESCRIPTION OF EMBODIMENTS

Figure 1A:
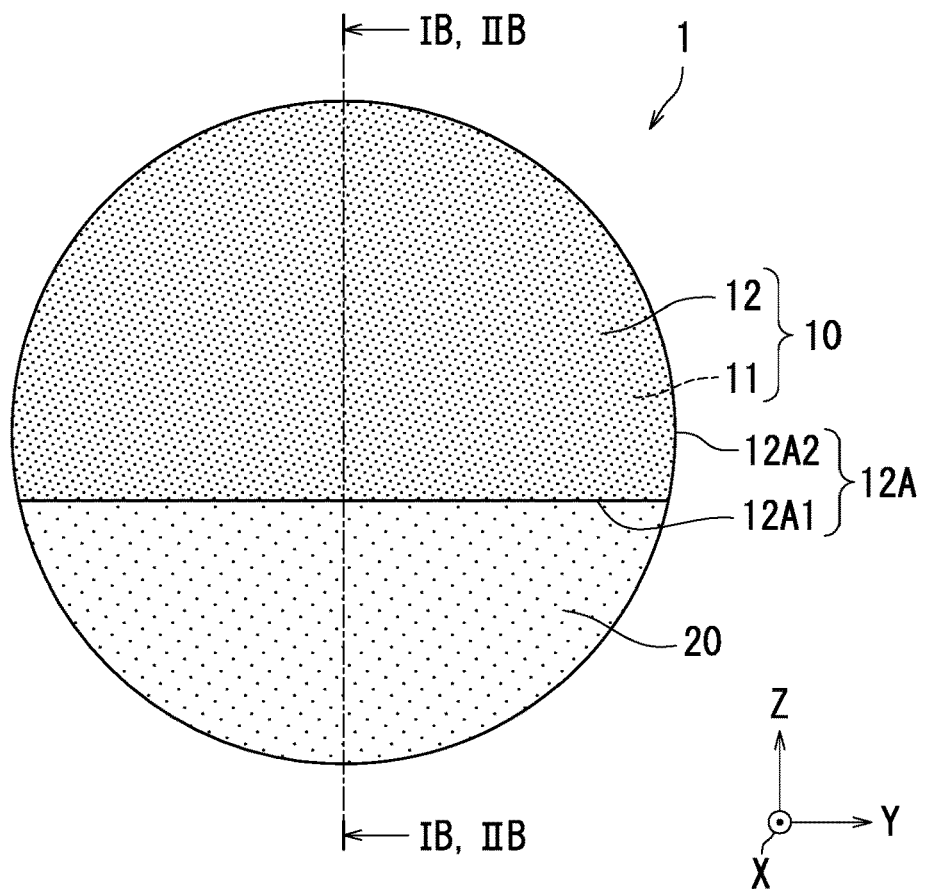
FIG. 1A is a front-side view of an eyeglass lens according to a first embodiment of the present invention when the eyeglass lens is viewed from the front side thereof.

The following describes embodiments of the present invention with reference to the accompanying drawings. Note that elements that are the same or equivalent are indicated by the same reference signs in the drawings and description thereof is not repeated. Furthermore, hatching for indicating a section is omitted as appropriate for the sake of simplicity of the drawings. In the embodiments, an X axis, a Y axis, and a Z axis of a three-dimensional Cartesian coordinate system are indicated as appropriate for facilitating understanding of the drawings. The direction of the Y axis is an example of a left-right direction in the field of view of a wearer of an eyeglass lens 1 of the present invention. The left-right direction in the field of view of the wearer is a direction from the left eye toward the right eye of the wearer, for example. In the following, the left-right direction in the field of view of the wearer of the eyeglass lens 1 may be referred to simply as "left-right direction". The direction of the Z axis is an example of an up-down direction in the field of view of the wearer of the eyeglass lens 1 of the present invention. The up-down direction in the field of view of the wearer is a direction perpendicular to the left-right direction, for example. In the following, the up-down direction in the field of view of the wearer of the eyeglass lens 1 may be referred to simply as "up-down direction". Furthermore, in the embodiments, the term "up" in the up-down direction refers to a direction from the mouth toward the nose of the wearer and the term "down" therein refers to a direction from the nose toward the mouth of the wearer, for example.

First Embodiment

Figure 1B:
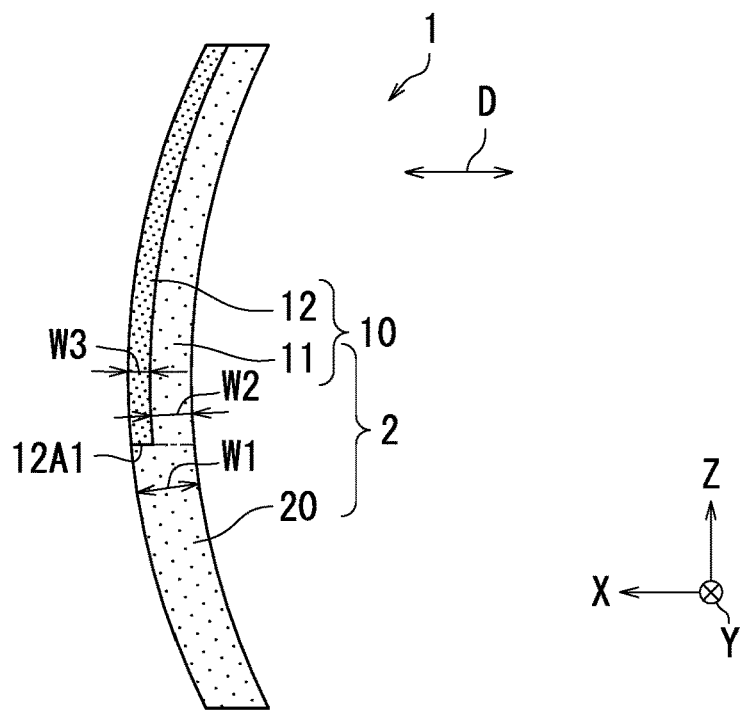
FIG. 1B is a cross-sectional view taken along a line IB-IB in FIG. 1A.

The eyeglass lens 1 according to a first embodiment of the present invention will be described with reference to FIGS. 1A to 11. An embodiment of the eyeglass lens 1 is described first with reference to FIGS. 1A and 1B. FIG. 1A is a front-side view of the eyeglass lens 1 of the first embodiment when the eyeglass lens 1 is viewed from the front side of the eyeglass lens 1. The eyeglass lens 1 has two surfaces one of which is the front surface located away from a wearer of the eyeglass lens 1. FIG. 1B is a cross-sectional view taken along a line IB-IB in FIG. 1A. As illustrated in FIG. 1A, the eyeglass lens 1 includes a polarizing part 10 and a non-polarizing part 20. Note that the polarizing part 10 and the non-polarizing part 20 are indicated by dot patterns with different densities in the drawings for the sake of easily distinguishing between the polarizing part 10 and the non-polarizing part 20. The eyeglass lens 1 is a lens to be used for eyeglasses. The eyeglass lens 1 is any of a polarizing lens, a solid color lens, a coated lens, a protective lens, and a bifocal lens, for example. Note that the eyeglasses will be described later with reference to FIG. 12.

The polarizing part 10 is adjacent to the non-polarizing part 20. Specifically, the polarizing part 10 is adjacent to the non-polarizing part 20 in a direction intersecting with a thickness direction D of the eyeglass lens 1. That is, the polarizing part 10 and the non-polarizing part 20 do not overlap with each other in the thickness direction D. The thickness direction D is a direction along the optical axis of the eyeglass lens 1, for example. Also, the thickness direction D of the eyeglass lens 1 is the same as the thickness direction of the polarizing part 10 or the thickness direction of the non-polarizing part 20, for example. For example, the polarizing part 10 and the non-polarizing part 20 are injection molded so as to be adjacent to each other. The polarizing part 10 has a polarizing function. Specifically, the polarizing part 10 includes a base part 11 and a polarizing sheet 12. As illustrated in FIG. 1B, the base part 11 and the polarizing sheet 12 are located to face each other in the thickness direction D.

The base part 11 is a light transmitting member. The base part 11 transmits light entering the base part 11 independent of the presence or absence of a polarization component contained in the light. The base part 11 is made of a colored resin. Specifically, the colored resin contains a colorant. The color of the colored resin is a transparent color, for example. The term transparent color herein means being colored and transparent. Examples of the transparent color include transparent blackish colors, transparent brownish colors, and transparent dark blueish colors. The base part 11 is made of a material such as a synthetic resin. Examples of the synthetic resin include polycarbonate, polyamide, polyethylene terephthalate, triacetate, and polyurethane. The base part 11 is thermoplastic, for example.

The polarizing sheet 12 is a polarizing member. The polarizing sheet 12 is a layered sheet, for example. The polarizing sheet 12 blocks a specific polarization component contained in light entering the polarizing sheet 12. The specific polarization component is S polarized light, for example. The polarizing sheet 12 has a thickness W3 of 0.3 mm to 0.6 mm, for example.

The polarizing sheet 12 is processed into a shape corresponding to the outer contour of the eyeglass lens 1 in a process of preparing the polarizing sheet 12. For example, the polarizing sheet 12 is processed to have a substantially circular shape or a substantial semicircular shape. Furthermore, in the process of preparing the polarizing sheet 12, the polarizing sheet 12 is bent into a shape corresponding to the shape of a curve of a specific lens. For example, the polarizing sheet 12 is bent into an arc in cross section with a specific curvature so as to protrude in a direction from a side close to the wearer toward a side away from the wearer.

The polarizing sheet 12 prepared is put for example in a mold in an injection molding apparatus (not illustrated) in a process of putting the polarizing sheet 12 in the mold. The injection molding apparatus includes an injection section, a mold, a mold clamping section, and a controller, for example. The injection section includes a hopper, a cylinder, and a spray nozzle, for example.

When the colored resin is melted and injected into the mold in which the polarizing sheet 12 is put, a light transmitting member 2 formed of the non-polarizing part 20 and the base part 11 is injection molded so that the polarizing sheet 12 and the base part 11 are in face contact with each other. The light transmitting member 2 is a single solid member.

The polarizing sheet 12 is in face contact with the base part 11 in a non-separable manner. The polarizing sheet 12 and the base part 11 are fused at an interface therebetween to be integral in injection molding, for example. As a result, the polarizing sheet 12 is non-separable from the base part 11. Thereafter, the eyeglass lens 1 is taken out of the mold.

The non-polarizing part 20 is adjacent to the polarizing part 10. The non-polarizing part 20 is a light transmitting member. The non-polarizing part 20 transmits light entering the non-polarizing part 20 independent of the presence or absence of a polarization component contained in the light. The non-polarizing part 20 is made of a colored resin. Specifically, the colored resin contains a colorant. The color of the colored resin is a transparent color, for example. Examples of the transparent color include transparent blackish colors, transparent brownish colors, and transparent dark blueish colors. The non-polarizing part 20 is made of a material such as a synthetic resin. Examples of the synthetic resin include polycarbonate, polyamide, polyethylene terephthalate, triacetate, and polyurethane. The non-polarizing part 20 is thermoplastic, for example.

The base part 11 and the non-polarizing part 20 form the light transmitting member 2 that is a single solid member. As such, the light transmitting member 2 is made of a colored resin. Specifically, the colored resin contains a colorant. The color of the colored resin is a transparent color, for example. Examples of the transparent color includes transparent blackish colors, transparent brownish colors, and transparent dark blueish colors. The light transmitting member 2 is made of a material such as a synthetic resin. Examples of the synthetic resin include polycarbonate, polyamide, polyethylene terephthalate, triacetate, and polyurethane. The light transmitting member 2 is thermoplastic, for example. The colored resin is generated for example as a result of a colored pellet being melted to be plastic before being injected (loaded) into the mold. The colored pellet includes a pellet that is colored, a natural pellet, and a masterbatch, for example. After the colored resin is loaded into the mold in which the polarizing sheet 12 is put, the light transmitting member 2 is injection molded out of the colored resin so that the polarizing sheet 12 is in face contact with the base part 11 in a non-separable manner. This colors the inside of the light transmitting member 2. Preferably, the light transmitting member 2 is colored uniformly as a whole. Furthermore, the polarizing sheet 12 and the light transmitting member 2 are fused at the interface therebetween to be integral.

The non-polarizing part 20 has a thickness W1 greater than a thickness W2 of the base part 11. For example, the thickness W1 of the non-polarizing part 20 is equal to a sum of the thickness W2 of the base part 11 and the thickness W3 of the polarizing sheet 12. The thickness W1 of the non-polarizing part 20 is 2.0 mm, for example. The thickness W2 of the base part 11 is 1.4 mm, for example. The thickness W3 of the polarizing sheet 12 is 0.6 mm, for example. The light transmitting member 2 is made of a colored resin, and the color density of the non-polarizing part 20 is accordingly in proportion to the thickness W1 of the non-polarizing part 20. Similarly, the color density of the base part 11 is in proportion to the thickness W2 of the base part 11. As such, the color density of the non-polarizing part 20 is higher than the color density of the base part 11.

For example, a manufacturer of the eyeglass lens 1 determines a ratio between transmittance of the non-polarizing part 20 and transmittance of the polarizing part 10 based on at least one of the color of the colored resin, the color density of the colored resin, and the thickness of the light transmitting member 2 in the process of injection molding the light transmitting member 2 out of the colored resin. Examples of the color of the colored resin include blackish colors, brownish colors, and dark blueish colors. The color density of the colored resin depends on the color density of the colored pellet, for example. The thickness of the light transmitting member 2 includes the thickness W1 of the non-polarizing part 20 and the thickness W2 of the base part 11. The transmittance is visible transmittance, for example. In the following, the "transmittance of the non-polarizing part 20" may be referred to as "non-polarizing transmittance", and the "transmittance of the polarizing part 10" may be referred to as "polarizing transmittance".

In the first embodiment, the polarizing sheet 12 is put in the mold and the light transmitting member 2, which is a single solid member, is injection molded out of the colored resin. As a result of the injection molding, the thickness W1 of the non-polarizing part 20 is greater than the thickness W2 of the base part 11 and the polarizing sheet 12 is in face contact with the base part 11 in a non-separable manner. This eliminates the need to provide a bonding layer of for example a bonding material between the polarizing sheet 12 and the base part 11. Thus, change in transmittance due to the presence of the bonding layer can be reduced. Furthermore, due to the light transmitting member 2 being made of a colored resin, the color density of the non-polarizing part 20 is in proportion to the thickness W1 of the non-polarizing part 20, for example. Similarly, due to the light transmitting member 2 being made of a colored resin, and the color density of the base part 11 is in proportion to the thickness W2 of the base part 11, for example. As such, the color density of the non-polarizing part 20 and the color density of the polarizing part 10 can be adjusted by adjusting the thickness W1 of the non-polarizing part 20 and the thickness W2 of the base part 11, respectively. This can achieve accurate adjustment of the transmittance of each of the polarizing part and the non-polarizing part.

Furthermore, the light transmitting member 2 is made of a colored resin in the first embodiment. For example, the light transmitting member 2 is molded by loading the colored resin into the mold. Therefore, the light transmitting member 2 has an inside that is colored. As such, the light transmitting member 2 can be colored substantially uniformly as a whole. This can reduce color irregularity of the eyeglass lens 1 resulting from for example abrasion on the surface of the eyeglass lens 1. Thus, change in transmittance of the eyeglass lens 1 due to color irregularity can be reduced.

Furthermore, in the first embodiment, the polarizing sheet 12 is processed into a shape corresponding to the shape of the outer contour of the eyeglass lens 1 and bent into a shape corresponding to the shape of the curve of the eyeglass lens 1 in the process of preparing. The light transmitting member 2 is molded along the polarizing sheet 12 in the process of injection molding the light transmitting member 2. As such, the light transmitting member 2 can be easily molded according to the entire shape of the eyeglass lens 1.

Furthermore, the ratio between the polarizing transmittance and the non-polarizing transmittance is determined based on at least one of the color of the colored resin, the color density of the colored resin, and the thickness of the light transmitting member 2 in the process of injection molding the light transmitting member 2 in the first embodiment. Therefore, the number of steps for manufacturing eyeglass lenses 1 with various ratios between the polarizing transmittance and the non-polarizing transmittance can be reduced.

Moreover, the polarizing sheet 12 has an outer periphery 12A. The outer periphery 12A includes for example a part of the outer periphery 12A and the other part of the outer periphery 12A, for example. In the following, the "part of the outer periphery 12A of the polarizing sheet 12" may be referred to as "first outer peripheral segment 12A1" and the "other part of the outer periphery 12A of the polarizing sheet 12" may be referred to as "second outer peripheral segment 12A2". The first outer peripheral segment 12A1 once connected to the non-polarizing part 20 serves as a boundary with the non-polarizing part 20, for example. The first outer peripheral segment 12A1 is linear in a direction intersecting with the up-down direction in the field of view of the wearer, for example. The direction intersecting with the up-down direction in the field of view of the wearer is the left-right direction in the field of view of the wearer, for example. In a case in which the first outer peripheral segment 12A1 is linear, the polarizing sheet 12 has a shape of a missing circle, for example. Note that the first outer peripheral segment 12A1 may have a curved shape or a bent line shape, for example.

In a case in which the polarizing sheet 12 has a shape of for example a missing circle, the non-polarizing part 20 has a shape of a missing circle. In other words, in a case in which the outer periphery 12A of the polarizing sheet 12 is composed of for example the first outer peripheral segment 12A1 and the second outer peripheral segment 12A2, the non-polarizing part 20 is in contact with the first outer peripheral segment 12A1 and out of contact with the second outer peripheral segment 12A2. Accordingly, the non-polarizing part 20 can be set further wide in the first embodiment. As a result, the field of view through the non-polarizing part 20 is hardly limited. Furthermore, a viewer in contact with the wearer recognizing the boundary between the polarizing part 10 and the non-polarizing part 20 may have an impression that the shape of the non-polarizing part 20 contributes to high level of design of the eyeglass lens 1 as a whole. Accordingly, design quality of the eyeglass lens 1 can be increased.

Figure 2A:
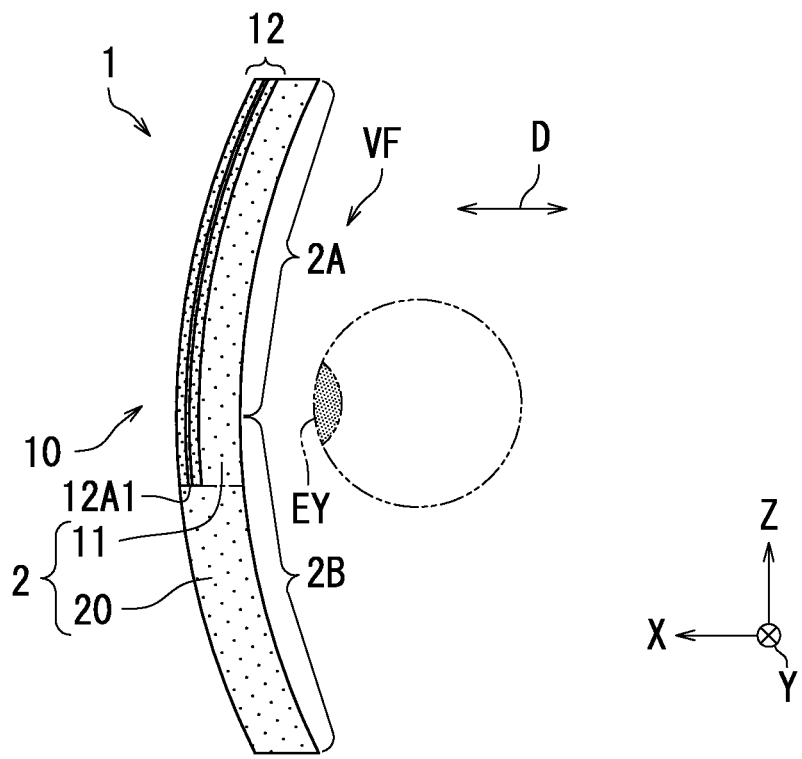
FIG. 2A is a cross-sectional view taken along a line IIB-IIB in FIG. 1A.
Figure 2B:
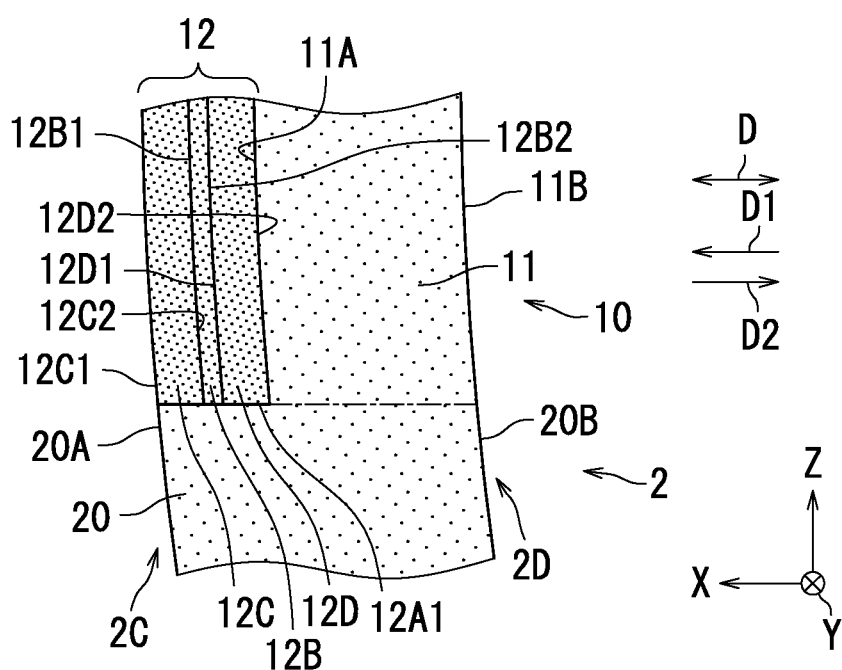
FIG. 2B is an enlarged partial view of FIG. 2A.

Detailed configuration of the eyeglass lens 1 will be described next with reference to FIGS. 2A and 2B. FIG. 2A is a cross-sectional view taken along a line IIB-IIB in FIG. 1A. FIG. 2B is an enlarged partial view of FIG. 2A.

As illustrated in FIG. 2A, the light transmitting member 2 includes an upper part 2A and a lower part 2B and the non-polarizing part 20 is located adjacent to the polarizing part 10 in the lower part 2B of the light transmitting member 2. Specifically, the upper part 2A of the light transmitting member 2 corresponds to the upper part of a field of view VF of the wearer. Also, the lower part 2B of the light transmitting member 2 corresponds to the lower part of the field of view VF of the wearer. The field of view VF is a field of view from an eye EY of the wearer wearing the eyeglass lens 1.

The non-polarizing part 20 is located below the polarizing part 10 in the up-down direction. That is, the first outer peripheral segment 12A1 of the polarizing sheet 12 is located at the lower part of the polarizing sheet 12. Accordingly, light passing through the non-polarizing part 20 mainly enters the lower part of the field of view VF in the first embodiment. As a result, dazzling brightness at the upper part and the central part of the field of view VF can be reduced and the wearer can view the lower part of the field of view VF through the non-polarizing part 20 more brightly than through the polarizing part 10. The non-polarizing part 20 transmits light independent of the presence or absence of a polarization component contained in light entering the non-polarizing part 20. Therefore, the wearer can easily view a liquid-crystal display especially at hand.

As illustrated in FIG. 2B, the polarizing sheet 12 includes a polarizing film 12B, a first cover layer 12C, and a second cover layer 12D. The polarizing film 12B, the first cover layer 12C, and the second cover layer 12D are layered.

The polarizing film 12B is a polarizer, and extracts a polarization component from non-polarized light, for example. The polarizing film 12B is formed for example in a manner that a resin having a hydroxy group, such as a polyvinyl alcohol resin, is extended uniaxially and immersed in for example an iodine-based compound or a dichromatic dye. The polarizing film 12B has a first surface 12B1 and a second surface 12B2 that is opposite to the first surface 12B1. The polarizing film 12B is sandwiched between the first cover layer 12C and the second cover layer 12D.

The first cover layer 12C and the second cover layer 12D protect the polarizing film 12B in the polarizing sheet 12. The first cover layer 12C and the second cover layer 12D each are a protective film, for example. The first cover layer 12C and the second cover layer 12D are each made of a synthetic resin such as polycarbonate or polyamide. Each of the first cover layer 12C and the second cover layer 12D is colorless and transparent, for example.

The first cover layer 12C covers the first surface 12B1 of the polarizing film 12B. Specifically, the first cover layer 12C has a first cover surface 12C1 and a second cover surface 12C2 opposite to the first cover surface 12C1. The first cover surface 12C1 serves as the front surface of the polarizing sheet 12 in a direction from the base part 11 toward the polarizing sheet 12, that is, a downstream surface. The second cover surface 12C2 and the first surface 12B1 of the polarizing film 12B face each other in contact with each other. For example, the second cover surface 12C2 is in close contact with the first surface 12B1.

The second cover layer 12D covers the second surface 12B2 of the polarizing film 12B. Specifically, the second cover layer 12D has a third cover surface 12D1 and a fourth cover surface 12D2 opposite to the third cover surface 12D1. The third cover surface 12D1 and the second surface 12B2 of the polarizing film 12B face each other in contact with each other. For example, the third cover surface 12D1 is in close contact with the second surface 12B2.

The base part 11 has a first base surface 11A and a second base surface 11B. The first base surface 11A and the second base surface 11B are opposite to each other in the thickness direction D of the eyeglass lens 1. In the following, in the thickness direction D of the eyeglass lens 1, a direction from the base part 11 toward the polarizing sheet 12 may be referred to as first direction D1 and a direction from the polarizing sheet 12 toward the base part 11 may be referred to as second direction D2. Note that the first direction D1 may for example be a direction from the rear surface toward the front surface of the eyeglass lens 1 or a direction from the wearer wearing the eyeglass lens 1 toward the eyeglass lens 1.

The second cover layer 12D is in face contact with the base part 11. Specifically, the fourth cover surface 12D2 of the second cover layer 12D is in face contact with the first base surface 11A of the base part 11. In a case in which the material of the base part 11 is polycarbonate, it is preferable that the material of the second cover layer 12D is also polycarbonate, for example. That is, it is preferable that the second cover layer 12D and the base part 11 are made of the same material. In the first embodiment, as a result of the second cover layer 12D and the base part 11 being made of the same material, the second cover layer 12D and the base part 11 are easily fused at the interface therebetween to be integral in injection molding of the light transmitting member 2. As such, the polarizing sheet 12 and the base part 11 can be easily brought into face contact with each other.

Furthermore, the material of the first cover layer 12C is preferably the same as the material of the second cover layer 12D and the base part 11 in the first embodiment. As a result of the first cover layer 12C, the second cover layer 12D, and the light transmitting member 2 being made of the same material as above, the light transmitting member 2 and the polarizing sheet 12 can be easily fused at the interface therebetween. In addition, when the surfaces of the polarizing part 10 and the non-polarizing part 20 are coated with a hard layer as whole, the hard layer hardly separates from the first cover layer 12C. The hard layer is a hard film provided by hard coating, for example. Therefore, various effects of coating on the eyeglass lens 1 can be exerted for a long period of time.

Moreover, the non-polarizing part 20 has a first non-polarizing surface 20A and a second non-polarizing surface 20B. The first non-polarizing surface 20A and the second non-polarizing surface 20B are opposite to each other in the thickness direction D of the eyeglass lens 1. The first non-polarizing surface 20A is the front surface of the non-polarizing part 20 in the first direction D1, that is, the downstream surface. The second non-polarizing surface 20B is the rear surface of the non-polarizing part 20 in the first direction D1, that is, the upstream surface.

The second non-polarizing surface 20B of the non-polarizing part 20 serves as one main surface of two main surfaces of the light transmitting member 2 in combination with the second base surface 11B of the base part 11. Specifically, the light transmitting member 2 has a first main surface 2C and a second main surface 2D opposite to the first main surface 2C. The second non-polarizing surface 20B of the non-polarizing part 20 serves as the second main surface 2D of the light transmitting member 2, which is the rear surface of the eyeglass lens 1, in combination with the second base surface 11B of the base part 11. Preferably, the second non-polarizing surface 20B and the second base surface 11B are aligned with each other.

The first non-polarizing surface 20A of the non-polarizing part 20 and the first cover surface 12C1 of the polarizing sheet 12 serve as the front surface of the eyeglass lens 1 in combination. The first non-polarizing surface 20A and the first cover surface 12C1 are preferably aligned with each other. The first non-polarizing surface 20A and the first cover surface 12C1 can be molded to be aligned with each other for example by injection molding the light transmitting member 2 with the polarizing sheet 12 put in the mold. In the first embodiment, as a result of the first cover layer 12C and the non-polarizing part 20 being aligned with each other, design quality of the front surface of the eyeglass lens 1 can be increased. Furthermore, processing for various types of coating on the front surface of the eyeglass lens 1 can be facilitated. In particular, in a case in which the light transmitting member 2 and the first cover layer 12C are made of the same material and the first cover layer 12C and the non-polarizing part 20 are aligning with each other, the first non-polarizing surface 20A of the non-polarizing part 20 and the first cover surface 12C1 are integrally fused easily in the process of injection molding the light transmitting member 2. As a result, continuity between the first non-polarizing surface 20A and the first cover surface 12C1 is increased.

Figure 3:
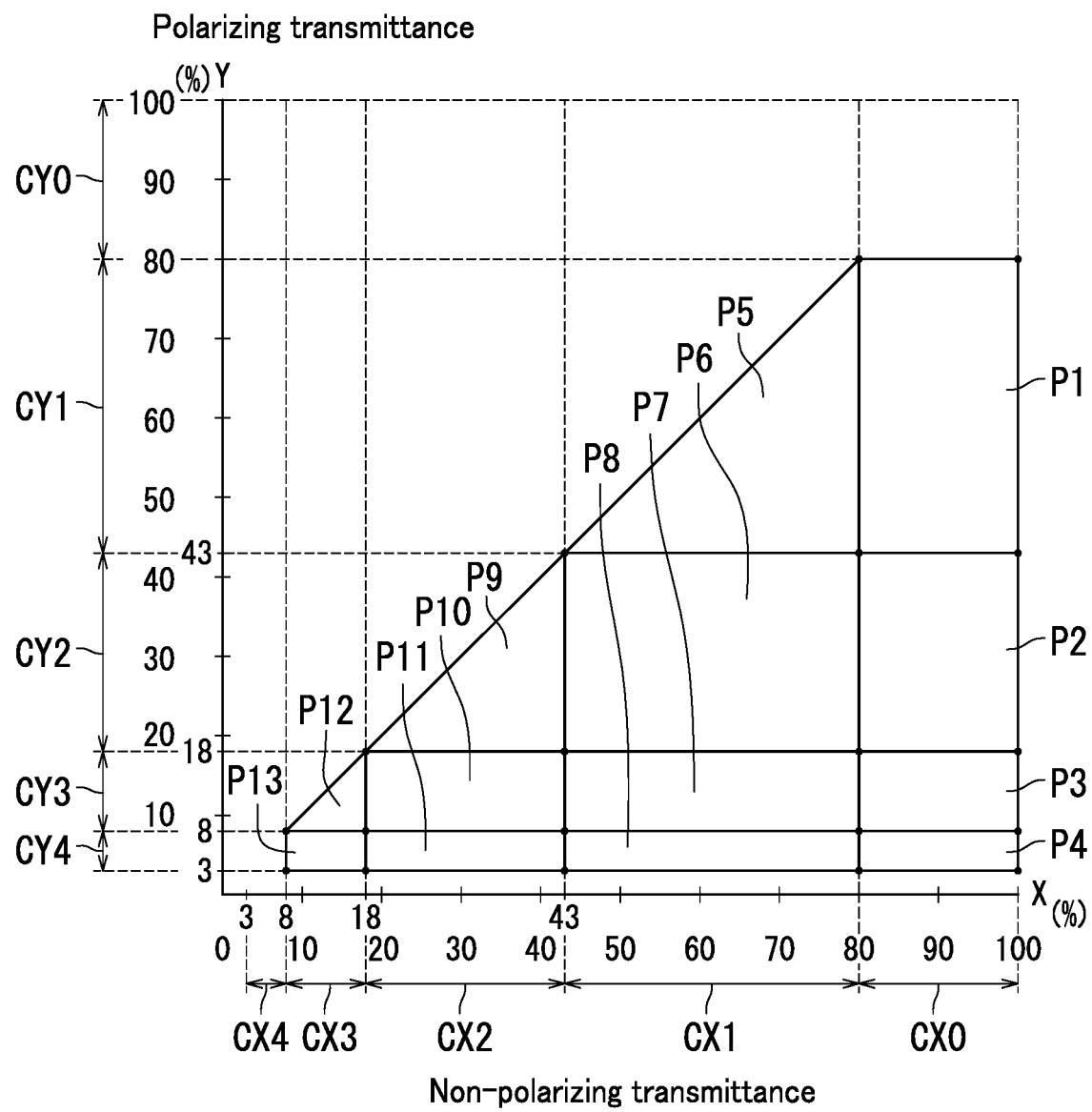
FIG. 3 is a graph representation showing a relationship between categories of transmittance of a polarizing part and categories of transmittance of a non-polarizing part in the eyeglass lens according to the first embodiment.

An example of a method for determining a ratio between the transmittance of the polarizing part 10 and the transmittance of the non-polarizing part 20 will be described next with reference to FIGS. 1A to 3. FIG. 3 is a graph representation showing a relationship between categories of the transmittance of the polarizing part 10 and categories of the transmittance of the non-polarizing part 20 in the eyeglass lens 1 according to the first embodiment.

For example, FIG. 3 shows an example of various combinations of the transmittance of the polarizing part 10 and the transmittance of the non-polarizing part 20 for determination of the ratio between the transmittance of the polarizing part 10 and the transmittance of the non-polarizing part 20. The horizontal axis indicates the transmittance (non-polarizing transmittance, unit: %) of the non-polarizing part 20 while the vertical axis indicates the transmittance (polarizing transmittance, unit: %) of the polarizing part 10. Each transmittance is visible transmittance, for example. The transmittance is classified into a plurality of categories according to its level. For example, categories defined in International Organization for Standardization (ISO) or Japanese Industrial Standard (JIS) can be adopted to the categories. In an example, the plurality of categories include 5 categories defined in "ISO 8980-3:2013".

For example, the manufacturer of the eyeglass lens 1 can determine a combination of the polarizing transmittance and the non-polarizing transmittance based on 4 categories out of the 5 different categories. The polarizing transmittance falls into any one of the 4 categories. The non-polarizing transmittance also falls into any one of the 4 categories. The 4 categories include a first category, a second category, a third category, and a fourth category.

The first category corresponds to "Category 1" defined in ISO. The first category corresponds to light shades, for example. A transmittance of in a range of greater than 43% and no greater than 80% falls into the first category, for example. In the following, the first category for a non-polarizing transmittance may be referred to as "first category CX1" and the first category for a polarizing transmittance may be referred to as "first category CY1" for the sake of convenience.

The second category corresponds to "Category 2" defined in ISO. The second category corresponds to intermediate shades, for example. A transmittance of in a rage of greater than 18% and no greater than 43% falls into the second category, for example. In the following, the second category for a non-polarizing transmittance may be referred to as "second category CX2" and the second category for a polarizing transmittance may be referred to as "second category CY2" for the sake of convenience.

The third category corresponds to "Category 3" defined in ISO. The third category corresponds to dark shades, for example. A transmittance of in a range of greater than 8% and no greater than 18% falls into the third category, for example. In the following, the third category for a non-polarizing transmittance may be referred to as "third category CX3" and the third category for a polarizing transmittance may be referred to as "third category CY3" for the sake of convenience.

The fourth category corresponds to "Category 4" defined in ISO. The fourth category corresponds to very dark shades, for example. A transmittance of in a range of greater than 3% and no greater than 8% falls into the fourth category, for example. In the following, the fourth category for a non-polarizing transmittance may be referred to as "fourth category CX4" and the fourth category for a polarizing transmittance may be referred to as "fourth category CY4" for the sake of convenience.

Note that the remaining category of the 5 categories other than the first category, the second category, the third category, and the fourth category corresponds to "Category 0" defined in ISO. "Category 0" corresponds to transparent or very light shades, for example. A transmittance of in a range of greater than 80% and no greater than 100% falls into "Category 0", for example. The manufacturer of the eyeglass lens 1 may determine the combination of the non-polarizing transmittance and the polarizing transmittance based on the four categories and "Category 0". In the following, a category for a non-polarizing transmittance corresponding to "Category 0" may be referred to as "category CX0" and a category for a polarizing transmittance corresponding to "Category 0" may be referred to as "category CY0" for the sake of convenience.

Examples of the combination to be determined in a process of determining the combination of the non-polarizing transmittance and the polarizing transmittance include combinations P1 to P13. The combinations P1 to P13 include: a combination of the category CX0 and the first category CY1; a combination of the category CX0 and the second category CY2; a combination of the category CX0 and the third category CY3; a combination of the category CX0 and the fourth category CY4; a combination of the first category CX1 and the first category CY1; a combination of the first category CX1 and the second category CY2; a combination of the first category CX1 and the third category CY3; a combination of the first category CX1 and the fourth category CY4; a combination of the second category CX2 and the second category CY2; a combination of the second category CX2 and the third category CY3; a combination of the second category CX2 and the fourth category CY4; a combination of the third category CX3 and the third category CY3; and a combination of the third category CX3 and the fourth category CY4. Note that it is preferable that the polarizing transmittance does not exceed the non-polarizing transmittance in each of the combinations P1 to P13.

In the first embodiment, in a case in which the combination of the non-polarizing transmittance and the polarizing transmittance is for example the combination P9 (combination of the second category CX2 and the second category CY2), the combination P10 (combination of the second category CX2 and the third category CY3), or the combination P12 (combination of the third category CX3 and the third category CY3), the non-polarizing transmittance and the polarizing transmittance can be adjusted with accuracy and the eyeglass lens 1 can be suitable for general purpose. Furthermore, the non-polarizing part 20 can be inconspicuous relative to the polarizing part 10. In particular, in a case with a combination in which the non-polarizing transmittance and the polarizing transmittance are substantially equal to each other in the eyeglass lens 1, the non-polarizing part 20 can be further inconspicuous relative to the polarizing part 10.

Moreover, in the first embodiment, in a case in which the combination of the non-polarizing transmittance and the polarizing transmittance is for example the combination P11 (combination of the second category CX2 and the fourth category CY4) or the combination P13 (combination of the third category CX3 and the fourth category CY4), the non-polarizing transmittance and the polarizing transmittance can be adjusted with accuracy and the eyeglass lens 1 can be suitable for various special purposes. Examples of the special purposes include applications for welding operations and purposes of protecting eyes from for example special ultraviolet rays or laser light beams.

Furthermore, in the first embodiment, in a case in which the combination of the non-polarizing transmittance and the polarizing transmittance is for example the combination P8 (combination of the first category CX1 and the fourth category CY4), a blight object and a dark object can be visually recognized even when the wearer is in a dark place. It becomes easy for example in an operation carrying out near a blast furnace to visually observe a bright blast furnace through the polarizing part 10, visually observe a manual at hand through the non-polarizing part 20 in the dark, and visually observe a liquid-crystal display at hand through the non-polarizing part 20. It also becomes easy for example to visually observe bright outside world through a window from a dark boat room and visually observe a liquid-crystal display of a smartphone at hand. In addition, the non-polarizing transmittance and the polarizing transmittance can be adjusted with accuracy and fashionable appearance owing to contrast between the shape of the polarizing part 10 and the shape of the non-polarizing part 20 can be appealed.

With an increase in transmittance of the non-polarizing part 20, the boundary between the polarizing part 10 and the non-polarizing part 20 becomes conspicuous in the eyeglass lens 1 regardless of the combination of the category for the polarizing part 10 and the category for the non-polarizing part 20. As such, the non-polarizing part 20 can be inconspicuous for the viewer in contact with the wearer by setting the transmittance of the non-polarizing part 20 to for example no greater than 50% in the first embodiment. By contrast, the contrast between the polarizing part 10 and the non-polarizing part 20 can be emphasized to the viewer by setting the transmittance of the non-polarizing part 20 to for example greater than 50% in the first embodiment.

Figure 4:
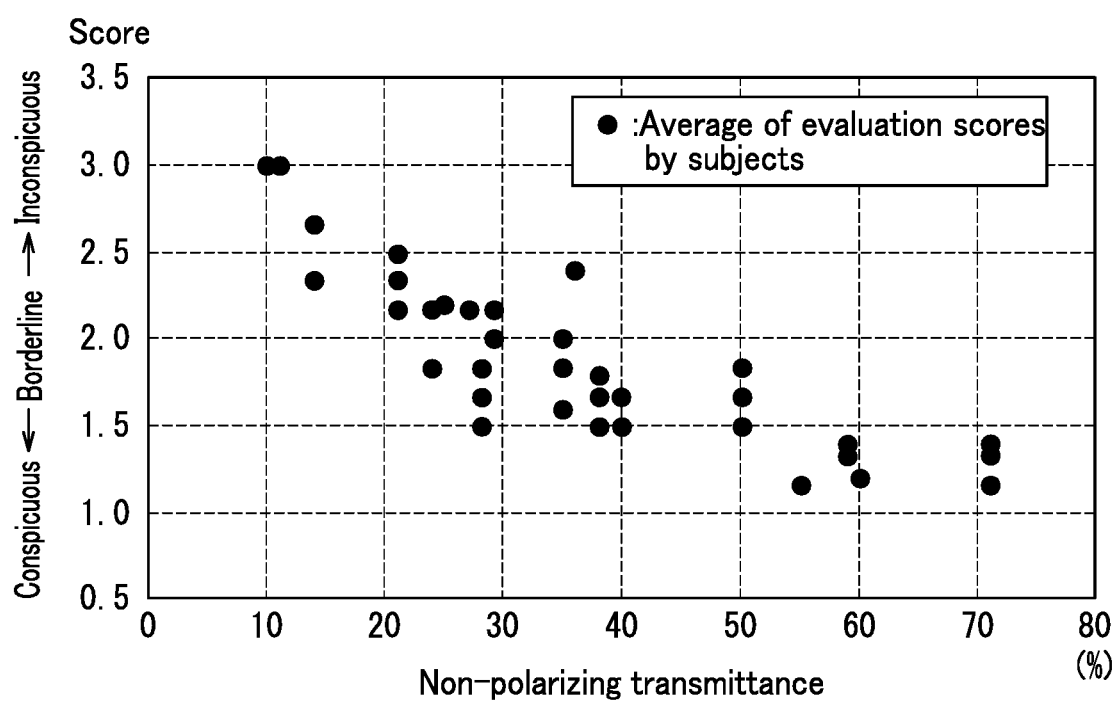
FIG. 4 is a graph representation showing a relationship between the transmittance of the non-polarizing part and conspicuousness of the boundary between the polarizing part and the non-polarizing part when each of eyeglass lenses according to an example of the present invention is viewed from the front side thereof.

The present invention will be further described based on an example with reference to FIG. 4. However, the present invention is not limited to the following example. Note that experimental conditions were as follows.

Six subjects performed a sensory test on a plurality of eyeglass lenses 1.

The subjects viewed each eyeglass lens 1 put on a table from the front side thereof, and evaluated in 3 levels. The subjects also viewed the eyeglass lens 1 reflected by a mirror in a state in which the eyeglass lens 1 is put in front of the eye, and evaluated in 3 levels. Respective scores on the 3 levels are 1, 2, and 3.

The evaluation was performed on the eyeglass lenses 1 that each included any one of a plurality of polarizing sheets 12 with mutually different transmittances and any one of a plurality of light transmitting members 2 with mutually different transmittances in combination. The polarizing sheet 12 of each eyeglass lens 1 had a thickness of 0.6 mm, the base part 11 thereof had a thickness of 1.4 mm, and the non-polarizing part 20 thereof had a thickness of 2.0 mm.

FIG. 4 is a graph representation showing a relationship between the non-polarizing transmittance and conspicuousness of the boundary between the polarizing part 10 and the non-polarizing part 20 when each of eyeglass lenses of the example of the present invention is viewed from the front side thereof. The horizontal axis indicates the non-polarizing transmittance (unit: %) while the vertical axis indicates conspicuousness (unit: score) of the boundary between the polarizing part 10 and the non-polarizing part 20 when each of the eyeglass lenses 1 was viewed from the front side thereof. Black circles in FIG. 4 each indicate the average of the evaluation scores by the subjects for a corresponding one of the eyeglass lenses 1.

As shown in FIG. 4, the boundary between the polarizing part 10 and the non-polarizing part 20 became conspicuous as the non-polarizing transmittance was increased. For example, when the non-polarizing transmittance was no greater than 50%, the boundary was inconspicuous due to the fact that the score for conspicuousness of the boundary was at least 1.5, which is an intermediate value for conspicuous of the boundary. Therefore, it was confirmed that the presence of the non-polarizing part 20 was made inconspicuous to the viewer in contact with the wearer through the non-polarizing transmittance being set to 50% or less.

When the non-polarizing transmittance was greater than 50% by contrast, the boundary was conspicuous due to the fact that the score for conspicuous of the boundary was less than 1.5, which is the intermediate value for conspicuousness of the boundary. As such, it was confirmed that contrast between the polarizing part 10 and the non-polarizing part 20 was emphasized to the viewer in contact with the wearer through the transmittance of the non-polarizing part 20 being set to greater than 50%. Therefore, it was confirmed that fashionable appearance owing to contrast between the shape of the polarizing part 10 and the shape of the non-polarizing part 20 can be appealed.

Figure 5:
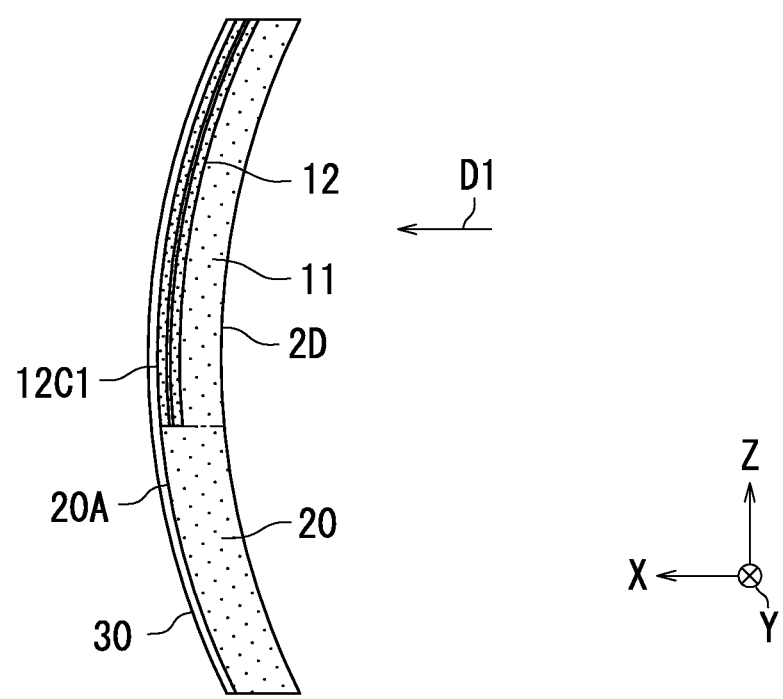
FIG. 5 is a cross-sectional view of an eyeglass lens according to the first embodiment.

Detailed configuration of the eyeglass lens 1 of the first embodiment will be described next with reference to FIG. 5. FIG. 5 is a cross-sectional view of the eyeglass lens 1 according to the first embodiment. As illustrated in FIG. 5, the eyeglass lens 1 may further include a reflective layer 30. The reflective layer 30 covers the polarizing sheet 12 and the non-polarizing part 20 on the front side of the eyeglass lens 1 in the first direction D1, that is, the downstream side. That is, the reflective layer 30 is a layer coating the front surface of the eyeglass lens 1. The reflective layer 30 reflects part of light entering the eyeglass lens 1 and transmits another part of the light. For example, the reflective layer 30 is a mirror coat layer. For example, the mirror coat layer is a blueish mirror coat layer (e.g., a blue mirror) or a silvery mirror coat layer (e.g., a silver mirror).

In the first embodiment, as a result of the reflective layer 30 being provided on the polarizing sheet 12 and the non-polarizing part 20, the polarizing sheet 12 and the non-polarizing part 20 can be covered with the reflective layer 30 as a whole and the reflective layer 30 can reflect part of light. As s a result, the viewer in contact with the wearer hardly recognizes the boundary between the polarizing sheet 12 and the non-polarizing part 20. Also, the edge of the non-polarizing part 20 can be further inconspicuous.

Furthermore, in the first embodiment, the ratio of the polarizing transmittance to the non-polarizing transmittance is preferably in a range from approximately 30% or more and approximately 70% or less, for example, as a range in which the boundary between the polarizing sheet 12 and the non-polarizing part 20 is especially unrecognizable to the viewer. For example, the ratio of the polarizing transmittance to the non-polarizing transmittance can be set within the range from approximately 30% or more and approximately 70% or less by adjusting the color density of the colored resin or adjusting the thickness of the light transmitting member 2 in the process of injection molding the light transmitting member 2 out of the colored resin with the polarizing sheet 12 put in the mold. The edge of the non-polarizing part 20 can be made effectively inconspicuous by setting the ratio of the polarizing transmittance to the non-polarizing transmittance to be in a range such as above.

An example of the present invention will be described next in detail with reference to FIG. 6. However, the present invention is not limited to the following example. Note that experimental conditions were as follows.

Six subjects performed a sensory test on a plurality of eyeglass lenses 1.

The subjects viewed each of the eyeglass lenses 1 put on a table from the front side thereof, and evaluated in 3 levels. The subjects also viewed the eyeglass lens 1 reflected by a mirror in a state in which the eyeglass lens 1 is put in front of the eye, and evaluated in 3 levels. Respective scores on the 3 levels are 1, 2, and 3.

As to an eyeglass lens 1 not including the reflective layer 30, the evaluation was performed on eyeglass lenses 1 that each included any one of a plurality of polarizing sheets 12 with mutually different transmittances and any one of a plurality of light transmitting members 2 with mutually different transmittances in combination. The polarizing sheet 12 of each eyeglass lens 1 had a thickness W3 of 0.6 mm, the base part 11 thereof had a thickness W2 of 1.4 mm, and the non-polarizing part 20 thereof had a thickness W1 of 2.0 mm.

As to an eyeglass lens 1 including the reflective layer 30, the evaluation was performed also on eyeglass lenses 1 that each included one of two reflective layers in mutually different colors, any one of the polarizing sheets 12 with mutually different transmittances, and any one of the light transmitting members 2 with mutually different transmittances in combination. The two reflective layers 30 were a blue mirror and a silver mirror. The polarizing sheet 12 of each eyeglass lens 1 had a thickness W3 of 0.6 mm, the base part 11 thereof had a thickness W2 of 1.4 mm, and the non-polarizing part 20 thereof had a thickness W1 of 2.0 mm.

Figure 6:
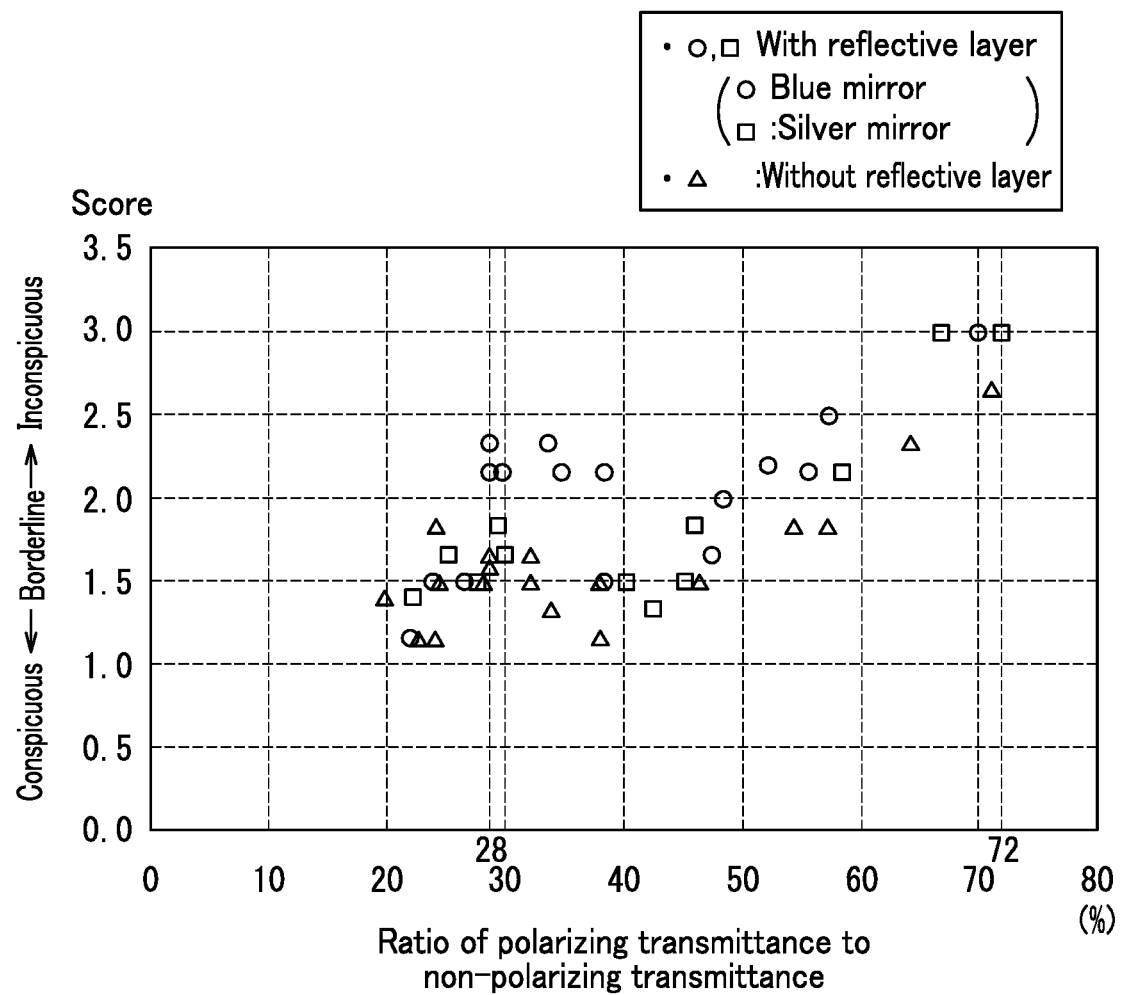
FIG. 6 is a graph representation showing a relationship between conspicuousness of the boundary between the polarizing part and the non-polarizing part when each of eyeglass lenses according to an example of the present invention is viewed from the front side thereof and a ratio of the transmittance of the polarizing part to the transmittance of the non-polarizing part.

FIG. 6 is a graph representation showing a relationship between the ratio of the transmittance of the polarizing part 10 to the transmittance of the non-polarizing part 20 and conspicuousness of the boundary between the polarizing part 10 and the non-polarizing part 20 when each of the eyeglass lenses 1 in the example of the present invention was viewed from the front side thereof. The horizontal axis indicates the ratio of the transmittance of the polarizing part 10 to the transmittance of the non-polarizing part 20 while the vertical axis indicates conspicuousness of the boundary between the polarizing part 10 and the non-polarizing part 20 when each eyeglass lens 1 was viewed from the front side thereof. The experiment was performed for each of a case of an eyeglass lens 1 including the reflective layer 30 and a case of an eyeglass lens 1 not including the reflective layer 30. Circles, squares, and triangles in FIG. 6 each indicate the average of the evaluation scores by the subjects for a corresponding one of the eyeglass lenses 1. Note that the circles indicate a case with a blue mirror while the squares indicate a case with the silver mirror in the case with the reflective layer 30 in FIG. 6. Also, the triangles indicate the case without the reflective layer 30.

As shown in FIG. 6, when eyeglass lenses 1 were compared that had the same ratio of the polarizing transmittance to the non-polarizing transmittance in a range from approximately 30% or more and approximately 70% or less, the eyeglass lenses 1 including the reflective layer 30 had higher evaluation scores than the eyeglass lenses 1 not including the reflective layer 30. Note that approximately 30% refers to a percentage including for example 28% as can be clear from the drawing. Also, approximately 70% refers to a percentage including for example 72% as can be clear from the drawing. As such, it was confirmed that the boundary between the polarizing part 10 and the non-polarizing part 20 was inconspicuous in the case with the reflective layer 30 than in the case without the reflective layer 30 when the ratio of the polarizing transmittance to the non-polarizing transmittance was in a range from approximately 30% or more and approximately 70% or less. It was additionally confirmed that the blue mirror was more inconspicuous than the silver mirror as the reflective layer 30.

Figure 7A:
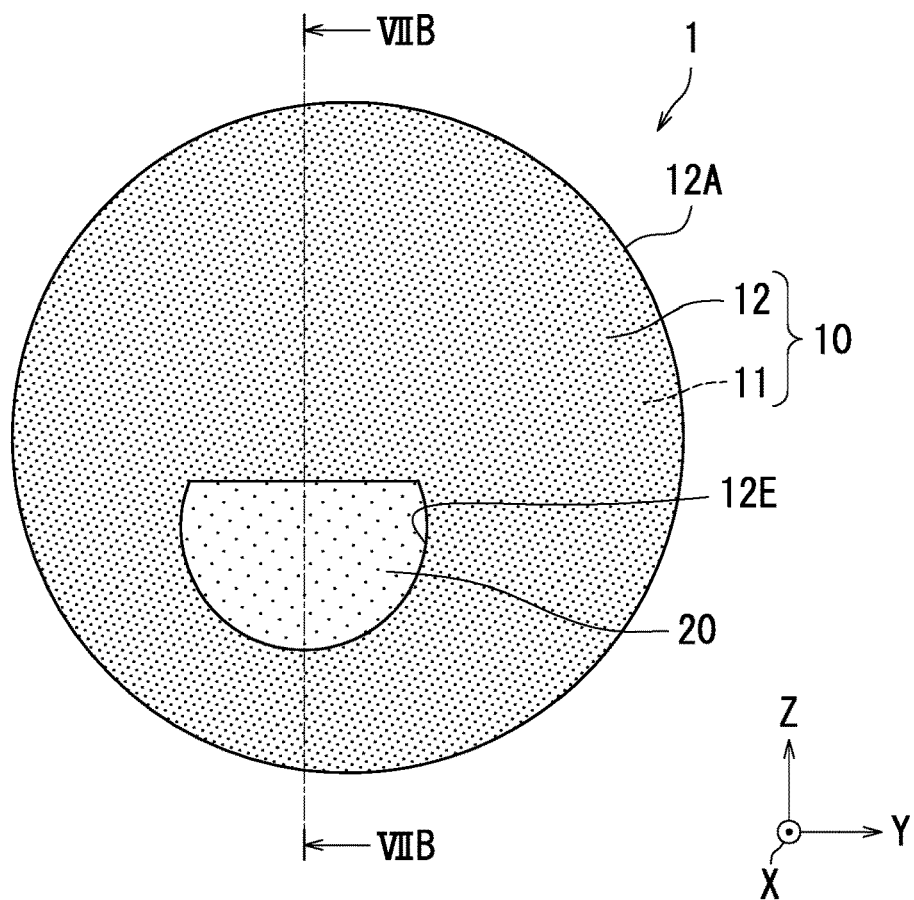
FIG. 7A is a front-side view of an eyeglass lens according to the first embodiment when the eyeglass lens is viewed from the front side thereof.
Figure 7B:
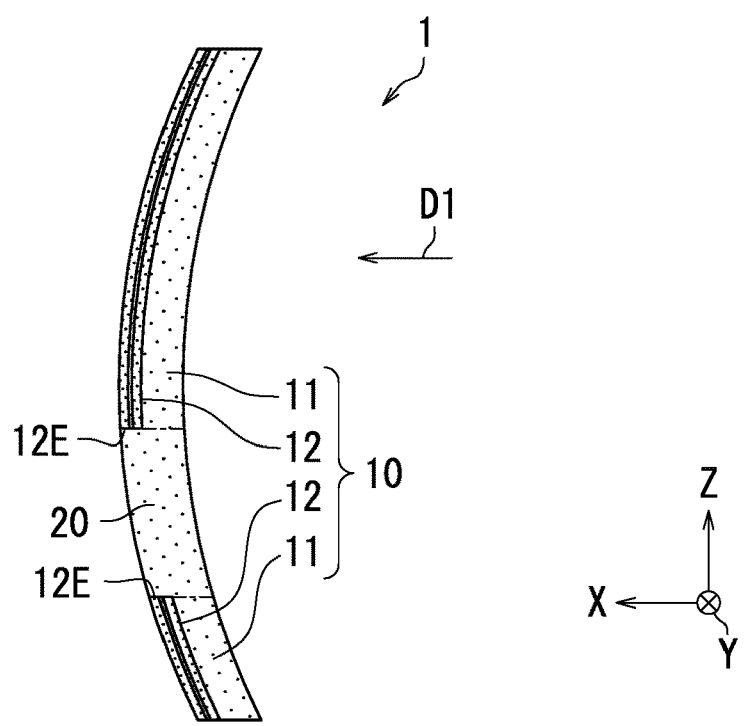
FIG. 7B is a cross-sectional view taken along a line VIIB-VIIB in FIG. 7A.

A further detailed configuration of the eyeglass lens 1 of the first embodiment will be described next with reference to FIGS. 7A and 7B. FIG. 7A is a front-side view of the eyeglass lens 1 when the eyeglass lens 1 is viewed from the front side thereof. FIG. 7B is a cross-sectional view taken along a line VIIB-VIIB in FIG. 7A. As illustrated in FIGS. 7A and 7B, the polarizing sheet 12 may have a hole 12E. Specifically, the hole 12E corresponds to a cutout part of the polarizing sheet 12. The non-polarizing part 20 is located in the hole 12E. Specifically, the hole 12E is formed in the polarizing sheet 12 in the process of preparing the polarizing sheet 12. In an embodiment in which the polarizing sheet 12 has a hole 12E, the non-polarizing part 20 is in contact with the hole 12E of the polarizing sheet 12, that is, the inner periphery of the polarizing sheet 12, and out of contact with the outer periphery 12A of the polarizing sheet 12.

When the non-polarizing part 20 is located in the hole 12E of the polarizing sheet 12 as above in the first embodiment, the ratio of the transmittance of the non-polarizing part 20 to the transmittance of the polarizing part 10 can be easily set so as to reduce dazzling brightness of light entering the non-polarizing part 20. As a result, the wearer convenience can be further increased and the non-polarizing part 20 can become further inconspicuous.

Figure 8A:
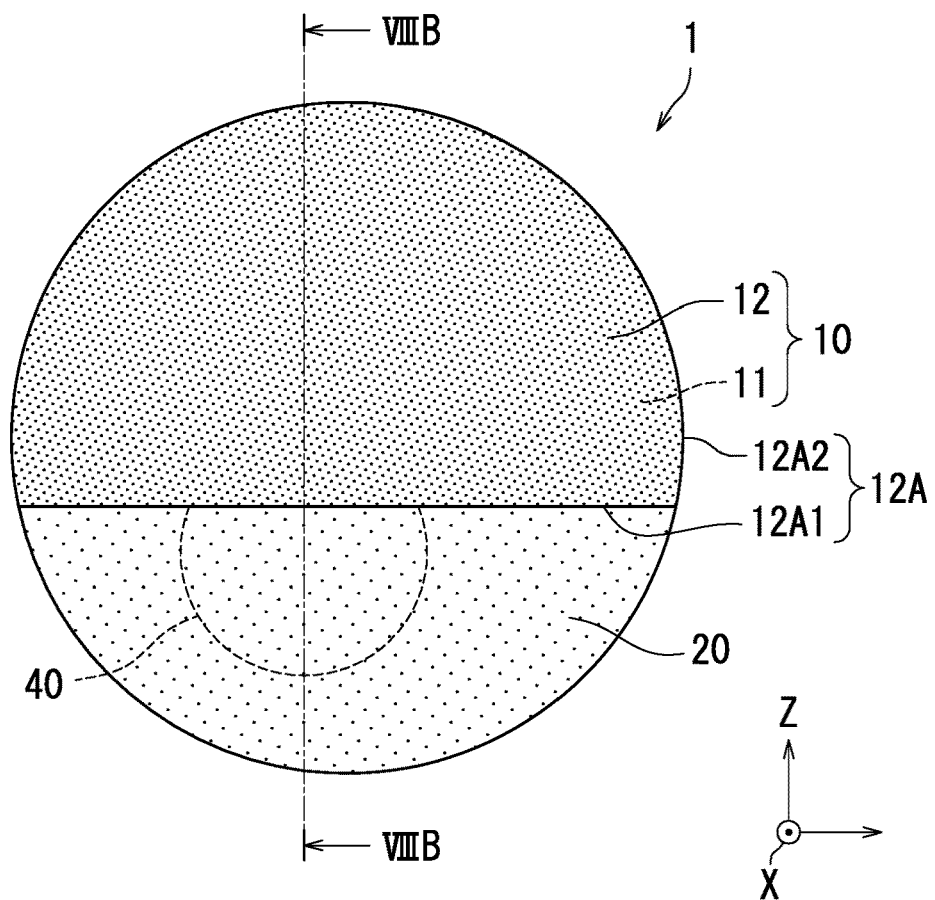
FIG. 8A is a front-side view of an eyeglass lens according to a variation of the first embodiment when the eyeglass lens is viewed from the front side thereof.
Figure 8B:
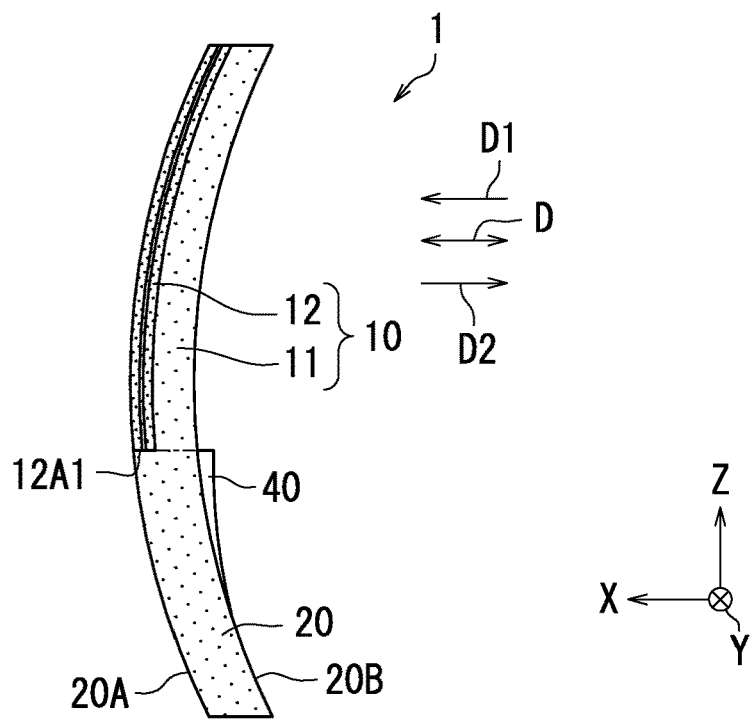
FIG. 8B is a cross-sectional view taken along a line VIIIB-VIIIB in FIG. 8A.

A configuration of an eyeglass lens 1 according to a variation of the first embodiment will be described next with reference to FIGS. 8A and 8B. FIG. 8A is a front-side view of the eyeglass lens 1 of the variation of the first embodiment when the eyeglass lens 1 is viewed from the front side thereof. FIG. 8B is a cross-sectional view taken along a line VIIIB-VIIIB in FIG. 8A. As illustrated in FIGS. 8A and 8B, the eyeglass lens 1 may further include a myopic part 40.

The myopic part 40 has refractive power for near view. The near view refers to a spot at the wearer's hand or a tabletop when the wearer is seated, for example. In detail, the myopic part 40 has a refractive power necessary to correct farsightedness caused by for example presbyopia. When the myopic part 40 is viewed in the second direction D2, the myopic part 40 has a shape of a missing circle, for example. Note that the myopic part 40 may be rectangular in shape, for example.

The myopic part 40 is located along the rear surface of the non-polarizing part 20 in the first direction D1, that is, on the second non-polarizing surface 20B. For example, the myopic part 40 is molded to be disposed along the non-polarizing part 20 in the process of injection molding. For example, the myopic part 40 is molded as a single solid member together with the light transmitting member 2. In the first embodiment, even if the wearer has presbyopia, the wearer can easily view a liquid-crystal display at hand while dazzling brightness can be reduced by the polarizing part 10.

Note that although FIGS. 8A and 8B illustrate an embodiment in which the non-polarizing part 20 is in contact with the first outer peripheral segment 12A1 and out of contact with the second outer peripheral segment 12A2, the myopic part 40 may be located along the non-polarizing part 20 even in the embodiment (FIGS. 7A and 7B) in which the polarizing sheet 12 has the hole 12E. For example, the myopic part 40 may be located along the second non-polarizing surface 20B of the non-polarizing part 20 across the hole 12E.

Figure 9:
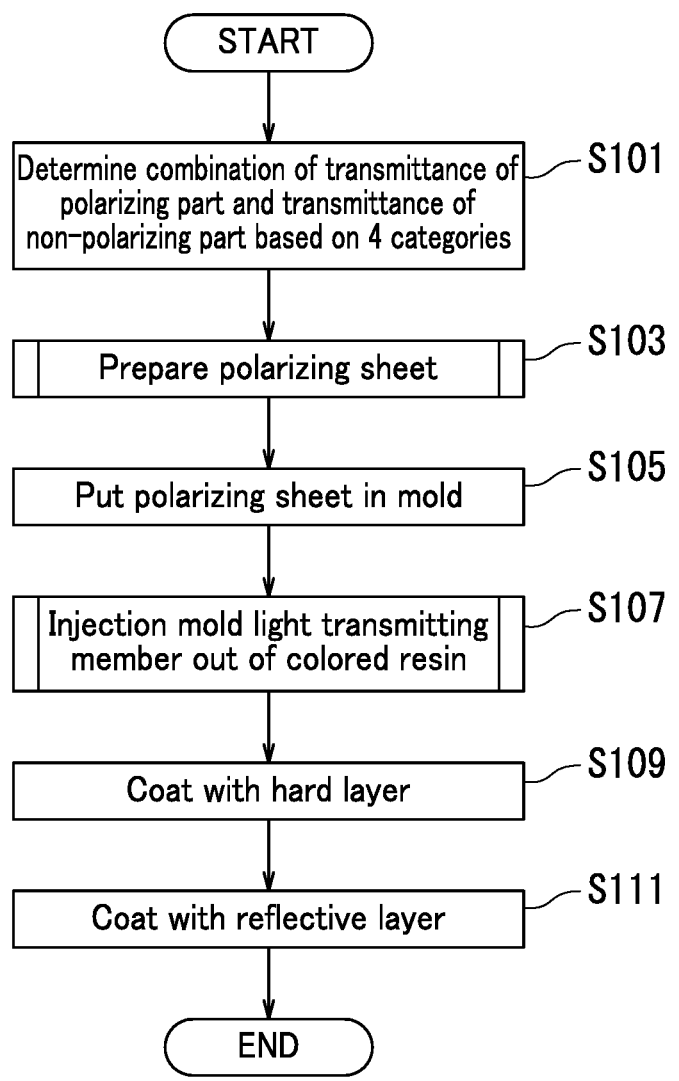
FIG. 9 is a flowchart depicting a method for manufacturing the eyeglass lens of the first embodiment.

An example of a manufacturing method of the eyeglass lens 1 will be described next with reference to FIGS. 1A to 9. FIG. 9 is a flowchart depicting a method for manufacturing the eyeglass lens 1. Through the processes of Steps S101 to Step S111 being performed, the eyeglass lens 1 is manufactured. Details are as follows.

In Step S101, a combination of the transmittance of the polarizing part 10 and the transmittance of the non-polarizing part 20 is determined based on the 4 categories among the mutually different 5 categories. The routine proceeds to Step S103.

In the next Step S103, the polarizing sheet 12 is prepared. The routine proceeds to Step S105.

In the next Step S105, the polarizing sheet 12 is put in the mold. The routine proceeds to Step S107.

In the next Step S107, the colored resin is melted and injected into the mold in which the polarizing sheet 12 is put for injection molding of the light transmitting member 2, which is a single solid member, so that the polarizing sheet 12 is in face contact with the base part 11. The eyeglass lens 1 is taken out of the mold then. The routine proceeds to Step S109.

In the next Step S109, the surfaces of the polarizing part 10 and the non-polarizing part 20 are coated with a hard layer as a whole. The routine proceeds to Step S111.

In the next Step S111, the reflective layer 30 is coated on the polarizing sheet 12 and the non-polarizing part 20 on the front side of the eyeglass lens 1 in the first direction D1. The routine ends then.

Note that the processes of Steps S101, S109, and S111 in FIG. 9 may be omitted.

Figure 10:
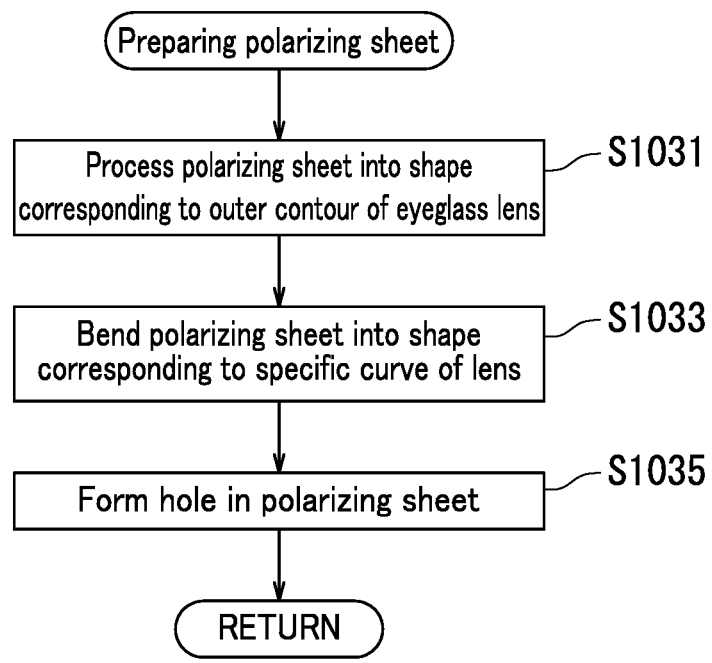
FIG. 10 is a flowchart depicting a process of preparing a polarizing sheet of the eyeglass lens of the first embodiment.

Details of the process of preparing the polarizing sheet 12 will be described herein with reference to FIGS. 1A to 10. FIG. 10 is a flowchart depicting an example of the process of preparing the polarizing sheet 12. Through the processes of Steps S1031 to S1035 being performed, the process of preparing the polarizing sheet 12 is performed. Details are as follows.

In Step S1031, the polarizing sheet 12 is processed into a shape corresponding to the outer contour of the eyeglass lens 1. The routine proceeds to Step S1033.

In the next Step S1033, the polarizing sheet 12 is bent into a shape corresponding to a curve of a specific lens. The routine proceeds to Step S1035.

In the next Step S1035, the hole 12E is formed in the polarizing sheet 12. The routine ends then.

Note that the polarizing sheet 12 may be processed into a shape with the first outer peripheral segment 12A1 and the second outer peripheral segment 12A2 in the process of Step S1031 among the processes depicted in FIG. 10. In the above case, the process of Step S1035 may be omitted.

Figure 11:
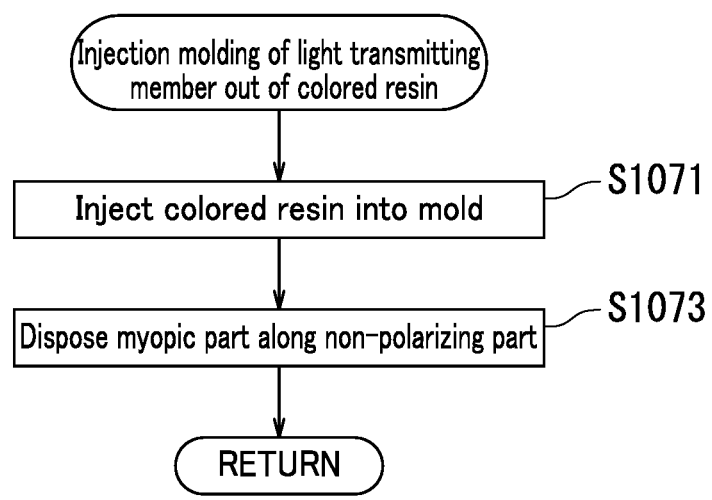
FIG. 11 is a flowchart depicting a process of injection molding a light transmitting member of the eyeglass lens of the first embodiment out of a colored resin.

The detailed description of the process of injection molding the light transmitting member 2 out of the colored resin will be described next herein with reference to FIGS. 1A to 11. FIG. 11 is a flowchart depicting an example of the process of injection molding the light transmitting member 2 out of the colored resin. Through the processes of Steps S1071 and S1073 being performed, the process of injection molding the light transmitting member 2 out of the colored resin is performed. Details are as follows.

In Step S1071, the colored resin is melted and injected into the mold in which the polarizing sheet 12 is put. The routine proceeds to Step S1073.

In the next Step S1073, the myopic part 40 is molded to be disposed along the non-polarizing part 20. The routine ends then.

Note that the process of Step S1073 may be omitted among the processes depicted in FIG. 11.

Second Embodiment

Figure 12:
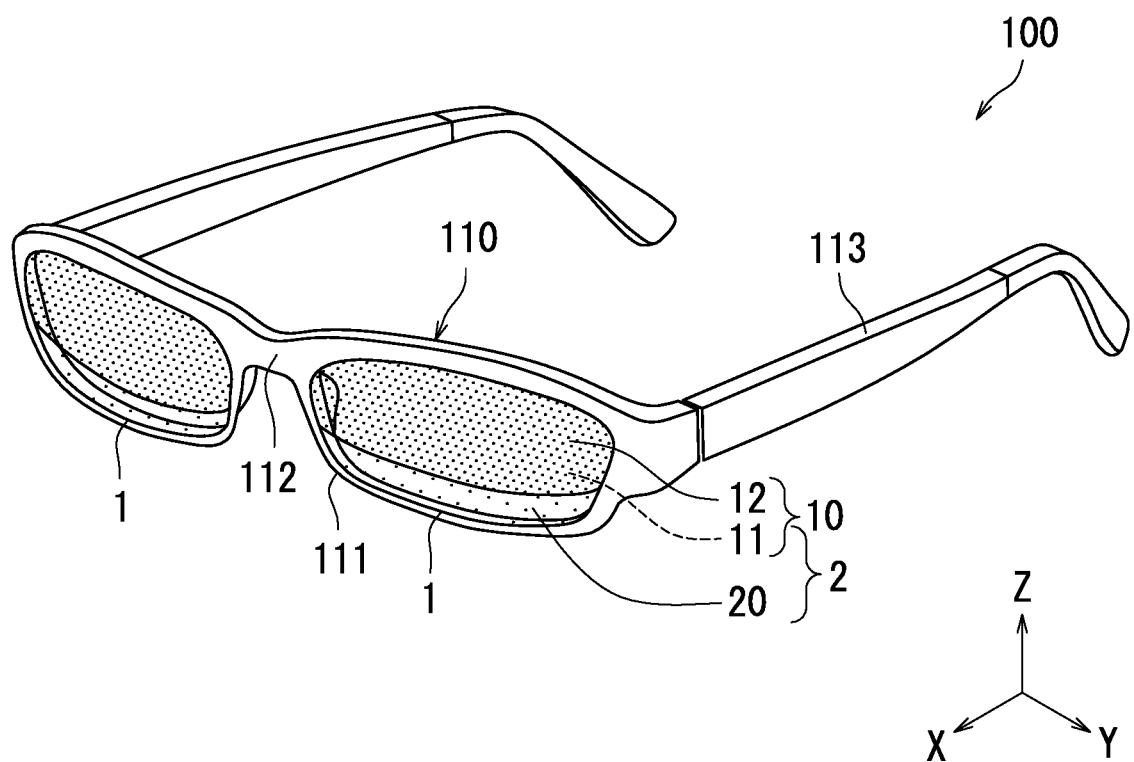
FIG. 12 is a perspective view of eyeglasses according to a second embodiment of the present invention when the eyeglasses are viewed from the front side of the eyeglass lenses thereof.

Eyeglasses 100 including the eyeglass lenses 1 of the first embodiment will be described next with reference to FIG. 1A to 12. FIG. 12 is a perspective view of the eyeglasses 100 according to a second embodiment of the present invention when the eyeglasses 100 are viewed from the front side of the eyeglass lenses 1. As illustrated in FIG. 12, the eyeglasses 100 include eyeglass lenses 1 and a support 110. The eyeglasses 100 are sunglasses, nearsighted glasses, farsighted glasses, bifocals, or a light-shielding tool, for example. Each of the eyeglass lenses 1 includes the polarizing part 10 and the non-polarizing part 20. Furthermore, the eyeglass lens 1 may further include the reflective layer 30 (see FIG. 5) and/or further include the myopic part 40 (see FIGS. 8A and 8B).

The support 110 supports the eyeglass lenses 1. The support 110 supports the paired eyeglass lenses 1, for example. Note that the support 110 may have a configuration to support a single eyeglass lens 1. The support 110 includes a rim 111, a bridge 112, and a temple 113, for example.

In the second embodiment, as a result of the eyeglasses 100 including the eyeglass lenses 1 and the support 110, the eyeglass lenses 1 including the polarizing parts and the non-polarizing parts each with accurately adjusted transmittance can be easily worn.

Embodiments of the present invention have been described so far with reference to the accompanying drawings. However, the present invention is not limited to the above embodiments and can be practiced in various ways within the scope without departing from the essence of the present invention. Furthermore, appropriate combination of elements of configuration disclosed in the above embodiments enables formation of various inventions. For example, some elements of configuration may be omitted from all the elements of configurations indicated in the embodiments.

Additionally, elements of configuration in different embodiments may be combined as appropriate. The drawings are schematic illustrations that emphasize elements of configuration in order to facilitate understanding thereof, and properties such as thickness, length, number, and interval of each of the elements of configuration illustrated in the drawings may differ from the actual properties thereof in order that elements of configuration can be easily illustrated. In addition, the material, shape, dimension, and the like of each of the elements of configuration indicated in the embodiments are only examples and not limited specifically. They can be altered in various ways within the scope without departing from the configuration of the present invention.

(1) As describe with reference to FIGS. 1A to 12, the base part 11 and the non-polarizing part 20 are thermoplastic. However, the present invention is not limited thereto. It is only required that the base part 11 and the non-polarizing part 20 form the light transmitting member that is a single solid member made of a colored resin. For example, the base part 11 and the non-polarizing part 20 may be thermosetting. In a case in which the base part 11 and the non-polarizing part 20 are made of a thermosetting resin, a light transmitting member that is formed of the base part 11 and the non-polarizing part 20 and that is a single solid member made of a colored resin can be formed for example by compression molding.

INDUSTRIAL APPLICABILITY

The present invention is applicable to the fields of eyeglass lenses, eyeglasses, and eyeglass lens manufacturing methods.

REFERENCE SIGNS LIST 1 eyeglass lens
10 polarizing part
11 base part
12 polarizing sheet
2 light transmitting member
20 non-polarizing part
W1, W2 thickness

The invention claimed is:
1. An eyeglass lens comprising:
a polarizing part including a base part and a polarizing sheet;
a non-polarizing part adjacent to the polarizing part; and
a reflective layer covering the polarizing sheet and the non-polarizing part and configured to reflect part of light and transmit another part of the light, wherein
a ratio of transmittance of the polarizing part to transmittance of the non-polarizing part is in a range from 28% or more and 72% or less,
the polarizing sheet is in face contact with the base part in a non-separable manner,
the non-polarizing part has a thickness greater than a thickness of the base part,
the base part and the non-polarizing part form a light transmitting member that is a single solid member, and
the light transmitting member is made of a colored resin.
2. The eyeglass lens according to claim 1, wherein
the light transmitting member has an inside that is colored.
3. The eyeglass lens according to claim 1, wherein
the light transmitting member includes an upper part and a lower part,
the non-polarizing part is located adjacent to the polarizing part in the lower part of the light transmitting member.
4. The eyeglass lens according to claim 1, wherein
the non-polarizing part is in contact with a part of an outer periphery of the polarizing sheet and out of contact with another part of the outer periphery of the polarizing sheet.
5. The eyeglass lens according to claim 1, wherein
the polarizing sheet has a hole, and
the non-polarizing part is located in the hole.
6. The eyeglass lens according to claim 1, wherein
the reflective layer covers the polarizing sheet and the non-polarizing part on a front side of the eyeglass lens in a direction from the base part toward the polarizing sheet.
7. The eyeglass lens according to claim 1, wherein
the polarizing sheet includes a first cover layer, a second cover layer, and a polarizing film having a first surface and a second surface opposite to the first surface,
the first cover layer covers the first surface of the polarizing film,
the second cover layer covers the second surface of the polarizing film and is in face contact with the base part, and
the second cover layer and the base part are made of the same material.
8. The eyeglass lens according to claim 1, further comprising
a myopic part with refractive power for near view, wherein
the myopic part is located along a rear surface of the non-polarizing part in a direction from the base part toward the polarizing sheet.
9. The eyeglass lens according to claim 8, wherein
the myopic part protrudes in a direction from the polarizing sheet toward the base part.
10. The eyeglass lens according to claim 1, wherein
the polarizing sheet has a front surface in a direction from the base part toward the polarizing sheet, the front surface being aligned with a front surface of the non-polarizing part in the direction from the base part toward the polarizing sheet.
11. Eyeglasses comprising:
the eyeglass lens according to claim 1; and
a support configured to support the eyeglass lens.
12. The eyeglass lens according to claim 1, wherein
the reflective layer is a blueish mirror coat layer.
13. A eyeglass lens manufacturing method for manufacturing an eyeglass lens including a polarizing part and a non-polarizing part adjacent to the polarizing part, comprising:
preparing a polarizing sheet that is to be included in the polarizing part of the eyeglass lens;
putting the polarizing sheet in a mold; and
injection molding a light transmitting member by injecting a colored resin into the mold in which the polarizing sheet is put so that the polarizing sheet is in face contact with a base part that is included in the polarizing part, the light transmitting member being a single solid member formed of the base part and the non-polarizing part, wherein
the non-polarizing part has a thickness greater than a thickness of the base part,
a ratio of transmittance of the polarizing part to transmittance of the non-polarizing part is determined based on at least one of color of the colored resin, color density of the colored resin, and thickness of the light transmitting member, and the ratio of the transmittance of the polarizing part to the transmittance of the non-polarizing part represents conspicuousness of a boundary between the polarizing part and the non-polarizing part.

14. The eyeglass lens manufacturing method according to claim 13, wherein
the preparing includes:
processing the polarizing sheet into a shape corresponding to an outer contour of the eyeglass lens; and
bending the polarizing sheet into a shape corresponding to a curve of a specific lens.

15. The eyeglass lens manufacturing method according to claim 13, further comprising
covering the polarizing sheet and the non-polarizing part with a reflective layer, the reflective layer being for reflecting part of light and transmitting another part of the light, wherein
the ratio of the transmittance of the polarizing part to the transmittance of the non-polarizing part is in a range from 28% or more and 72% or less.

16. The eyeglass lens manufacturing method according to claim 13, wherein
the injection molding includes molding a myopic part so that the myopic part is disposed along the non-polarizing part, the myopic part having refractive power for near view, and
in the molding a myopic part, the myopic part is disposed along a rear surface of the non-polarizing part in a direction from the base part toward the polarizing sheet.

17. The eyeglass lens manufacturing method according to claim 13, further comprising
determining a combination of transmittance of the polarizing part and transmittance of the non-polarizing part based on mutually different 4 categories, wherein
the transmittance of the polarizing part falls into any one of the four categories,
the transmittance of the non-polarizing part falls into any one of the four categories,
the four categories include a first category, a second category, a third category, and a fourth category,
a transmittance falling into the first category is in a range of greater than 43% and no greater than 80%,
a transmittance falling into the second category is in a range of greater than 18% and no greater than 43%,
a transmittance falling into the third category is in a range of greater than 8% and no greater than 18%, and
a transmittance falling into the fourth category is in a range of greater than 3% and no greater than 8%.

18. The eyeglass lens manufacturing method according to claim 17, wherein,
the transmittance of the polarizing part and the transmittance of the non-polarizing part are substantially equal to each other, and
each of the transmittance of the polarizing part and the transmittance of the non-polarizing part falls in the second category, or
each of the transmittance of the polarizing part and the transmittance of the non-polarizing part falls in the third category, or
the transmittance of the polarizing part falls in the third category and the transmittance of the non-polarizing part falls in the second category.

19. The eyeglass lens manufacturing method according to claim 17, wherein,
in the combination of the transmittance of the polarizing part and the transmittance of the non-polarizing part, the transmittance of the polarizing part does not exceed the transmittance of the non-polarizing part.

20. The eyeglass lens manufacturing method according to claim 17, wherein,
in manufacturing as the eyeglass lens an eyeglass lens used for viewing a bright object and a dark object in a dark place, the transmittance of the polarizing part falls in the fourth category and the transmittance of the non-polarizing part falls in the first category.

21. The eyeglass lens manufacturing method according to claim 13, wherein
the transmittance of the non-polarizing part is greater than 50%.

22. The eyeglass lens manufacturing method according to claim 13, wherein
the transmittance of the non-polarizing part is no greater than 50%.

23. An eyeglass lens comprising:
a polarizing part including a base part and a polarizing sheet; and
a non-polarizing part adjacent to the polarizing part, wherein
the non-polarizing part has a transmittance of no greater than 50%,
the polarizing sheet is in face contact with the base part in a non-separable manner,
the non-polarizing part has a thickness greater than a thickness of the base part,
the base part and the non-polarizing part form a light transmitting member that is a single solid member,
the light transmitting member is made of a colored resin, and
the eyeglass lens does not include a reflective layer that covers the polarizing sheet and the non-polarizing part.

* * * * *